2,991,169
PENTACHLOROPHENOL EMULSIFIABLE CONCENTRATES

Elias Fischer, Chicago, Ill., assignor, by mesne assignments, to Armour and Company, Chicago, Ill., a corporation of Delaware
No Drawing. Filed June 20, 1957, Ser. No. 667,031
7 Claims. (Cl. 71—2.3)

This invention relates to emulsifiable concentrates of pentachlorophenol. In one of its aspects, this invention relates to pentachlorophenol compositoins of improved stability and dispersibility in water.

Pentachlorophenol is a well-known commercial chemical and is used quite extensively as a contact herbicide, soil toxicant and plant defoliant. It is also employed as a preservative for cordage, leather and textiles. The most important use for pentachlorophenol is as a wood preservative used to protect timber products against staining organisms, decay organisms and wood destroying insects including both subterranean and dry wood termites. As a herbicide pentachlorophenol is used among berry bushes, in orchards and vineyards, in sugar cane and pineapple fields and to control grasses and weeds around industrial buildings, tank farms and railroad yards and roadbeds where other herbicides have proved ineffective.

In most of the aforementioned applications the pentachlorophenol is used in the form of an aqueous emulsion, primarily because of cost and the ready availability of water as a diluent. However, there are numerous problems associated with the preparation of a suitable pentachlorophenol emulsion. First of all, pentachlorophenol is extremely insoluble in water, having a solubility of the order of about 15 parts per million at 27° C. with the result that it has an extreme tendency to crystallize out of solution. Further, even employing many of the common and well-known emulsifiers, the resulting emulsions have not proved stable to an acceptable degree. Water hardness also plays an important part in the production of a suitable emulsion. Another problem has been the amount of time required to adequately disperse the concentrated solution of the pentachlorophenol in its solvent into the water phase, and it is not at all uncommon to employ a colloid mill to promote the dispersion. Even then, the emulsions have a tendency to separate and cannot be reconstituted upon simple mixing.

In accordance with the present invention I have now provided an emulsifiable concentrate of pentachlorophenol which overcomes many of the aforementioned problems and is highly stable, and which gives excellent flash dispersion upon simple mixing with water to form emulsions of considerably improved stability. My improved pentachlorophenol emulsifiable concentrate consists essentially of 5% to 20% by weight of pentachlorophenol, from about 75% to 94% by weight of an aromatic hydrocarbon diluent and from 1% to 5%, preferably about 2% to 3%, by weight of the disalicylate salt of a compound having the formula

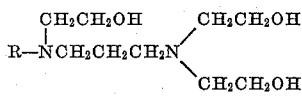

wherein R is an aliphatic hydrocarbon radical having from 8 to 22 carbon atoms. It will be appreciated that larger amounts of the emulsifier will be used for higher concentrations of the pentachlorophenol.

The pentachlorophenol of my improved composition is commercially available from several companies and is sold under such trade names as Santophen 20 and Dowicide 7.

The aromatic hydrocarbon diluent employed in my pentachlorophenol concentrate can consist of such aromatic hydrocarbons as benzene, toluene, xylene and mixtures of aromatic hydrocarbons such as may result from petroleum reforming processes. The preferred diluent is xylene. Another preferred diluent is a commercial mixture of aromatic hydrocarbons sold under the trade name Sovacide 544.

The active emulsifying ingredient of my emulsifiable pentachlorophenol concentrate consists of the disalicylate salt of a N-aliphatic-N,N',N'-tris(2-hydroxyethyl)trimethylene diamine, the diamine portion of which is represented in the foregoing structural formula. Examples of aliphatic hydrocarbon radicals containing from 8 to 22 carbon atoms which come within the definition of R of the formula include octyl, decyl, dodecyl, tetradecyl, hexadecyl, octadecyl, octadecenyl, octadecadienyl, octadecatrienyl, and statical mixtures of the foregoing radicals as are contained in naturally occurring oils and fats such as tallow, soybean oil, coconut oil, and the like. For example, the mixture of aliphatic hydrocarbon radicals contained in tallow is comprised of approximately 45% by weight of octadecenyl, 25% octadecyl and 30% hexadecyl radicals. The mixture of aliphatic hydrocarbon radicals contained in soybean oil is comprised of approximately 37% by weight of octadecadienyl, 26% octadecenyl, 17% octadecyl and 20% hexadecyl radicals. Examples of preferred emulsifiers include the salts N-tallow-N,N',N'-tris(2-hydroxyethyl)trimethylene diamine disalicylate, N-soya-N,N',N'-tris(2-hydroxyethyl)trimethylene diamine disalicylate, N-octadecyl-N,N',N'-tris(2-hydroxyethyl)trimethylene diamine disalicylate and N-hexadecyl-N,N',N'-tris(2-hydroxyethyl)trimethylene diamine disalicylate. To facilitate ease of handling, the active emulsifying ingredient is preferably employed as a 75% by weight solution in a solvent such as xylene.

A specific example of a pentachlorophenol emulsifiable concentrate coming within the present invention consists of 10% by weight of pentachlorophenol, 87% xylene and 3% of the salt N-tallow-N,N',N'-tris(2-hydroxyethyl)trimethylene diamine disalicylate. Another example consists of 15% by weight of pentachlorophenol, 80% by weight of a mixture of aromatic hydrocarbons sold under the trade name Sovacide 544–C, and 5% of the salt N-tallow-N,N',N'-tris(2-hydroxyethyl)trimethylene diamine disalicylate.

In the preparation of my emulsifiable pentachlorophenol concentrates the pentachlorophenol is first dissolved in the aromatic hydrocarbon diluent and the active emulsifying agent is then added. A unique and valuable property of the pentachlorophenol emulsifiable concentrates of the present invention is the instantaneous dispersion of the concentrate upon addition to water. Besides flash dispersion, my concentrate produces emulsions stable in hard and soft water. Further, any separation occurring in the emulsion after long standing is easily redispersed.

The following example will help to understand and appreciate the advantages and underlying principles of the present invention, but it is to be understood that this example is not to be construed as unduly limiting:

EXAMPLE

A series of emulsions were prepared from a concentrate consisting of 15% by weight of pentachlorophenol, 80% by weight of a mixture of aromatic hydrocarbons sold under the trade name Sovacide 544–C, and 5% by weight of N-tallow-N,N'-N'-tris(2-hydroxyethyl)trimethylene diamine disalicylate. The emulsions were prepared by mixing 5 parts by volume of the concentrate with 95 parts by volume of water. In the testing the spontaneity of emulsification of the concentrate upon addition to water and the quality of the emulsion formed after mixing were observed. After standing undisturbed the amount of cream or oil separating from the emulsion was measured. Then after standing for twenty hours the ease of redispersion of the oil or cream was rated. The results and observations of these tests are given in Table I.

Table I

| Water Hardness, p.p.m. | Distilled | 120 | 400 | 800. |
|---|---|---|---|---|
| Flash | Good | Fair | Excellent | Excellent. |
| Emulsion, initial | do | Good | do | Do. |

| Standing: | Separation, percent by volume | | | |
|---|---|---|---|---|
| 0.5 hours | O—none / C—trace | O—none / C—trace | O—none / C—trace | O—none. / C—trace. |
| 1 hour | O—none / C—1 | O—none / C—trace | O—none / C—1.5 | O—none. / C—1. |
| 2 hours | O—none / C—2.5 | O—none / C—2 | O—none / C—3 | O—none. / C—2. |
| 3 hours | O—none / C—3 | O—0.5 / C—3 | O—none / C—3 | O—none. / C—2. |
| 20 hours | O—none / C—5 | O—4 / C—none | O—none / C—5 | O—none. / C—5. |
| Redispersion | Excellent | Good | Excellent | Excellent. |

O—oil; C—cream.

While this invention has been described and exemplified in terms of its preferred embodiments, those skilled in the art will appreciate that modifications can be made without departing from the spirit and scope of the invention.

I claim:

1. An emulsifiable concentrate for use in forming aqueous pentachlorophenol emulsions consisting essentially of 5% to 20% by weight of pentachlorophenol, from about 75% to 94% by weight of an aromatic hydrocarbon diluent, and from 1% to 5% by weight of the disalicylate salt of a compound having the formula

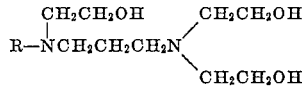

wherein R is an aliphatic hydrocarbon radical having from 8 to 22 carbon atoms said concentrate being dispersible and stable in water.

2. An emulsifiable concentrate according to claim 1 wherein the salt is N-tallow-N,N',N'-tris(2-hydroxyethyl)-trimethylene diamine disalicylate.

3. An emulsifiable concentrate according to claim 1 wherein the salt is N-soya-N,N',N'-tris(2-hydroxyethyl)-trimethylene diamine disalicylate.

4. An emulsifiable concentrate for use in forming aqueous pentachlorophenol emulsions essentially of about 10% by weight of pentachlorophenol, 87% by weight of aromatic hydrocarbon diluent and 3% by weight of a disalicylate salt of a compound having the formula

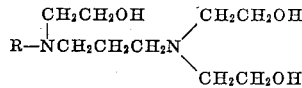

wherein R is an aliphatic hydrocarbon radical having from 8 to 22 carbon atoms said concentrate being dispersible and stable in water.

5. An emulsifiable concentrate for use in forming aqueous pentachlorophenol emulsions consisting essentially of about 15% by weight of pentachlorophenol, about 80% by weight of an aromatic hydrocarbon diluent and about 5% by weight of the disalicylate salt of a compound having the formula

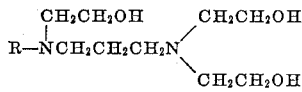

wherein R is an aliphatic hydrocarbon radical having from 8 to 22 carbon atoms said concentrate being dispersible and stable in water.

6. An emulsifiable concentrate for use in forming aqueous pentachlorophenol emulsions consisting essentially of about 10% by weight of pentachlorophenol, 87% by weight of xylene and 3% by weight of the salt N-tallow-N,N',N'-tris(2-hydroxyethyl)trimethylene diamine disalicylate said concentrate being dispersible and stable in water.

7. An emulsifiable concentrate for use in forming aqueous pentachlorophenol emulsions consisting essentially of about 15% by weight of pentachlorophenol, about 80% by weight of xylene and about 5% by weight of the salt N-tallow-N,N',N'-tris(2-hydroxyethyl)trimethylene diamine disalicylate said concentrate being dispersible and stable in water.

References Cited in the file of this patent

UNITED STATES PATENTS

| 1,872,826 | Schulemann et al. | Aug. 23, 1932 |
| 2,128,334 | Stockelbach | Aug. 30, 1938 |
| 2,188,734 | Carswell | Jan. 30, 1940 |
| 2,267,205 | Kyrides | Dec. 23, 1941 |
| 2,599,827 | Hansberry | June 10, 1952 |

FOREIGN PATENTS

| 156,982 | Australia | June 9, 1954 |